United States Patent
Rehman et al.

(10) Patent No.: US 12,196,713 B2
(45) Date of Patent: Jan. 14, 2025

(54) CONVEX ULTRASONIC SENSOR FOR WELD INSPECTION

(71) Applicant: Saudi Arabian Oil Company, Dhahran (SA)

(72) Inventors: Aziz U. Rehman, Dhahran (SA); Isa H. Al-Mudaibegh, Dhahran (SA); Muhannad A. Yousef, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 573 days.

(21) Appl. No.: 17/410,749

(22) Filed: Aug. 24, 2021

(65) Prior Publication Data

US 2023/0061122 A1 Mar. 2, 2023

(51) Int. Cl.
*G01N 29/06* (2006.01)
*G01N 29/265* (2006.01)
*G01N 29/44* (2006.01)
*G06T 1/00* (2006.01)

(52) U.S. Cl.
CPC ......... *G01N 29/069* (2013.01); *G01N 29/265* (2013.01); *G01N 29/44* (2013.01); *G06T 1/0007* (2013.01); *G01N 2291/0289* (2013.01); *G01N 2291/267* (2013.01)

(58) Field of Classification Search
CPC .... G01N 29/069; G01N 29/265; G01N 29/44; G01N 29/0654; G01N 29/221; G01N 29/225; G01N 29/2456; G01N 29/2487; G01N 29/043; G01N 2291/0289; G01N 2291/267; G01N 2291/2634; G06T 1/0007
USPC ......................................................... 73/588
See application file for complete search history.

(56) References Cited

U.S. PATENT DOCUMENTS

| | | | |
|---|---|---|---|
| 3,346,508 A | 10/1967 | Thompson | |
| 3,622,825 A | 11/1971 | Bennett | |
| 3,971,962 A | 7/1976 | Green | |
| 4,265,121 A | 5/1981 | Cribbs | |
| 4,467,237 A | 8/1984 | Piaget et al. | |
| 4,473,921 A | 10/1984 | Weber et al. | |

(Continued)

FOREIGN PATENT DOCUMENTS

| CA | 2763427 A1 * | 12/2010 | ........... G01N 29/225 |
|---|---|---|---|
| CN | 107843649 | 3/2018 | |

(Continued)

OTHER PUBLICATIONS

Ccj-online.com [online], "HRSG Inspection Tools," available on or before Feb. 25, 2019, retrieved on May 22, 2019, retrieved from URL <www.ccj-online.com/wp-content/uploads/gravity_forms/3-b246f63cf9a9ff5af247a3db291cb13f/2016/05/HRSG-NDT-Brochure.pdf>.

(Continued)

*Primary Examiner* — Jacques M Saint Surin
(74) *Attorney, Agent, or Firm* — Fish & Richardson P.C.

(57) ABSTRACT

A system and a method embodiment or automatic inspection of branch wells is provided. An exemplary system includes a scanning head including an ultrasonic probe, wherein the ultrasonic probe includes a convex crystal. A track is mounted to a branch pipe welded to a main pipe, wherein the scanning head mounts to the track, and wherein the scanning head moves the ultrasonic probe along the track. The system includes a controller configured to display an image based on data provided from the ultrasonic probe.

20 Claims, 10 Drawing Sheets

(56) References Cited

U.S. PATENT DOCUMENTS

| | | | |
|---|---|---|---|
| 4,597,874 | A | 7/1986 | Francis |
| 4,641,529 | A | 2/1987 | Lorenzi et al. |
| 4,870,278 | A | 9/1989 | Leonardi-Cattolica et al. |
| 4,964,059 | A | 10/1990 | Sugaya et al. |
| 5,219,471 | A | 6/1993 | Goual et al. |
| 5,340,477 | A | 8/1994 | Simon |
| 5,460,046 | A | 10/1995 | Maltby et al. |
| 6,110,352 | A | 8/2000 | Su et al. |
| 6,220,099 | B1* | 4/2001 | Marti .................. G01N 27/902 73/633 |
| 6,379,304 | B1* | 4/2002 | Gilbert ................ G01S 15/8934 600/447 |
| 6,388,439 | B1 | 5/2002 | Lembeye |
| 6,783,493 | B2* | 8/2004 | Chiang ............... G01S 7/52074 600/437 |
| 7,231,331 | B2 | 6/2007 | Davis |
| 7,234,335 | B2* | 6/2007 | Lolli .................... F28F 21/088 72/348 |
| 7,617,603 | B2 | 11/2009 | Coleman et al. |
| 7,705,058 | B2 | 4/2010 | Coutinho et al. |
| 7,706,988 | B2 | 4/2010 | McNealy et al. |
| 7,798,023 | B1 | 9/2010 | Hoyt et al. |
| 8,079,263 | B2 | 12/2011 | Randall et al. |
| 8,201,454 | B2 | 6/2012 | Paige |
| 8,215,174 | B2 | 7/2012 | Cain, Jr. |
| 8,468,889 | B2 | 6/2013 | Schubert et al. |
| 8,738,339 | B2 | 5/2014 | Richard et al. |
| 8,888,706 | B2 | 11/2014 | Chen et al. |
| 9,063,059 | B2 | 6/2015 | Na et al. |
| 9,086,354 | B2 | 7/2015 | Al-Sahan et al. |
| 9,181,499 | B2 | 11/2015 | Mason et al. |
| 9,335,302 | B2 | 5/2016 | Oberdoerfer et al. |
| 9,526,475 | B2 | 12/2016 | Specht et al. |
| 9,782,693 | B2 | 10/2017 | Evanovich et al. |
| 9,804,132 | B2 | 10/2017 | Hoyt |
| 10,060,567 | B2 | 8/2018 | Van Nie et al. |
| 10,458,822 | B2 | 10/2019 | Pirner |
| 10,527,588 | B2 | 1/2020 | Torichigai et al. |
| 10,845,343 | B2* | 11/2020 | Davis .................. G01N 29/265 |
| 10,921,286 | B2 | 2/2021 | Boenisch |
| 11,090,580 | B2 | 8/2021 | Al-Jundi et al. |
| 11,221,314 | B2 | 1/2022 | Sutherland et al. |
| 2003/0136195 | A1 | 7/2003 | Krieg et al. |
| 2004/0015079 | A1* | 1/2004 | Berger ................ G01S 7/5208 600/443 |
| 2005/0150842 | A1 | 7/2005 | Puik |
| 2007/0239968 | A1 | 10/2007 | Moyer et al. |
| 2008/0178679 | A1 | 7/2008 | Hirao et al. |
| 2008/0184784 | A1 | 8/2008 | Dam |
| 2012/0017998 | A1 | 1/2012 | Al-Sahan et al. |
| 2014/0191135 | A1 | 7/2014 | Partington et al. |
| 2014/0202929 | A1 | 7/2014 | Mason et al. |
| 2015/0080727 | A1 | 3/2015 | Specht et al. |
| 2016/0327419 | A1 | 11/2016 | Hellevang et al. |
| 2020/0371068 | A1 | 11/2020 | Rehman et al. |
| 2021/0039017 | A1 | 2/2021 | Al-Jundi et al. |
| 2022/0011099 | A1 | 1/2022 | Inoh |
| 2024/0019086 | A1* | 1/2024 | Pirsiavash ............ G01N 17/00 |

FOREIGN PATENT DOCUMENTS

| | | |
|---|---|---|
| EP | 304053 | 2/1989 |
| GB | 860194 | 2/1961 |
| JP | S56155848 | 12/1981 |
| JP | H 08188151 | 7/1996 |
| JP | H1183817 | 3/1999 |
| JP | 2013170845 | 9/2013 |
| WO | WO 9931499 | 6/1999 |

OTHER PUBLICATIONS

Chen et al., "Broadband Focusing Ultrasonic Transducers Based on Dimpled LiNbO3 Plate With Inversion Layer," IEEE Transactions on Ultrasonics, Ferroelectrics, and Frequency Control, Dec. 2012, 59(12), 6 pages.

Ginzel et al., "Automated Ultrasonic Inspection of Nozzle Welds using Phased-Array Ultrasonic Testing, Part 1—Inside Access," Simulation in NDT, Online Workshop in www.ndt.net, Sep. 2010, 13 pages.

Ginzel et al., "Automated Ultrasonic Inspection of Nozzle Welds using Phased-Array Ultrasonic Testing, Part 2—Outside Access," Simulation in NDT, Online Workshop in www.ndt.net, Sep. 2010, 13 pages.

Moles and Labbe, "Ultrasonic inspection of pressure vessel construction welds using phased arrays," R/D Tech, 3rd MENDT— Middle East Nondestructive Testing Conference & Exhibition, Nov. 2005, 23 pages.

Moles and Zhang, "Construction Weld Testing Procedures Using Ultrasonic Phased Arrays," From Materials Evaluation, The American Society for Nondestructive Testing, Inc., 2005, 63(1): 27-33, 7 pages.

Otzisk, "Oil/Water Separation Technologies," Digital Refining—Process, Operation and Maintenance, retrieved from URL <https://www.digitalrefining.com/article/1000798,Oil_water_separation_technologies.html#.XQvzHGCWxiU>, Apr. 2013, 2 pages.

Padron, "System and Method for Separation of Crude or Hydrocarbon Free and/or Disperse water," SPE Production, Exploration and Upgrading PDVSA SA, SPE-71468, 2001 SPE Annual Conference and Exhibition in New Orleans, Louisiana, Sep. 30-Oct. 3, 2001, 7 pages.

Pekdemir et al., "Emulsification of Crude Oil-Water Systems using Biosurfactants," Transactions of IChemE, Part B, Process Safety and Environmental Protection, vol. 83, B1, Jan. 2005, 10 pages.

Slb.com [online], "EPF Crude Oil Treatment," retrieved from URL <https://www.slb.com/~/media/Files/testing/other/epf_crude_oil_treatment.pdf>, available on or before Feb. 25, 2019, 1 page.

Sun and Zhu, "Real-Time, Label-Free Detection of Biomolecular Interactions in Sandwich Assays by the Oblique-Incidence Reflectivity Difference Technique," Sensors, Dec. 2014, 14: 23307-23320, 14 pages.

Swanekamp, "HRSG Inspectors," Power Engineering, retrieved from URL <https://www.power-eng.com/articles/print/volume-110/issue-10/features/hrsg-inspections.html>, retrieved on May 22, 2019, published Oct. 1, 2006, 8 pages.

Testex-ndt.com [online], "HRSG Inspections," available on or before Mar. 18, 2016 via the Wayback Machine URL <https://web.archive.org/web/20160318001332/https://testex-ndt.com/services/hrsg-inspections/>, retrieved on May 22, 2019, retrieved from URL <https://testex-ndt.com/services/hrsg-inspections/>, 6 pages.

Twomey, Inspection Techniques for Detecting Corrosion Under Insulation, NDT Net., vol. 3, No. 2, retrieved from URL <www.ndt.net/article/0298/twomey/twomey.htm>, Feb. 1998, 6 pages.

PCT International Search Report and Written Opinion in International Appln. No. PCT/US2022/075351, dated Nov. 4, 2022, 14 pages.

[No Author Listed], "Ultrasonic Crack Detection," Pipecare, Innovative Solutions, 2021, 7 pages.

Barbian et al., "In-Line Inspection of High Pressure Transmission Pipelines: State-of-the-Art and Future Trends," 18th World Conference on Nondestructive Testing, Durban, South Africa, Apr. 16 -20, 2012, 21 pages.

Beller et al., "Combined In-Line Inspection of Pipelines for Metal Loss and Cracks," ECNDT 2006, 13 pages.

Imasonic.com [online], "Immersion Circular Element Transducer," available on or before Sep. 20, 2020, via Internet Archive: Wayback Machine URL<https://web.archive.org/web/20230000000000*/https://www.imasonic.com/industry/online-design/>, retrieved on May 3, 2024, (https://www.imasonic.com/industry/online-design/), 2 pages.

Kachanov et al., "Requirements for Choosing the Parameters of Broadband Transducers for Testing Objects with High Damping of Ultrasonic Signals," Russian Journal of Nondestructive Testing, 2007, 43(11):743-754, 12 pages.

Ndt-global.com [online], Pulse Echo Crack, 2024, retrieved on May 3, 2024, retrieved from URL<https://www.ndt-global.com/technologies/pulse-echo-crack/>, 6 pages.

(56) References Cited

OTHER PUBLICATIONS

Triger et al., "MOSAIC An Integrated Ultrasonic 2D Array System. Simon Triger," IEEE International Ultrasonics Symposium, Oct. 28-31, 2007, New York, United States, Apr. 30, 20081021-1024, 5 pages.

* cited by examiner

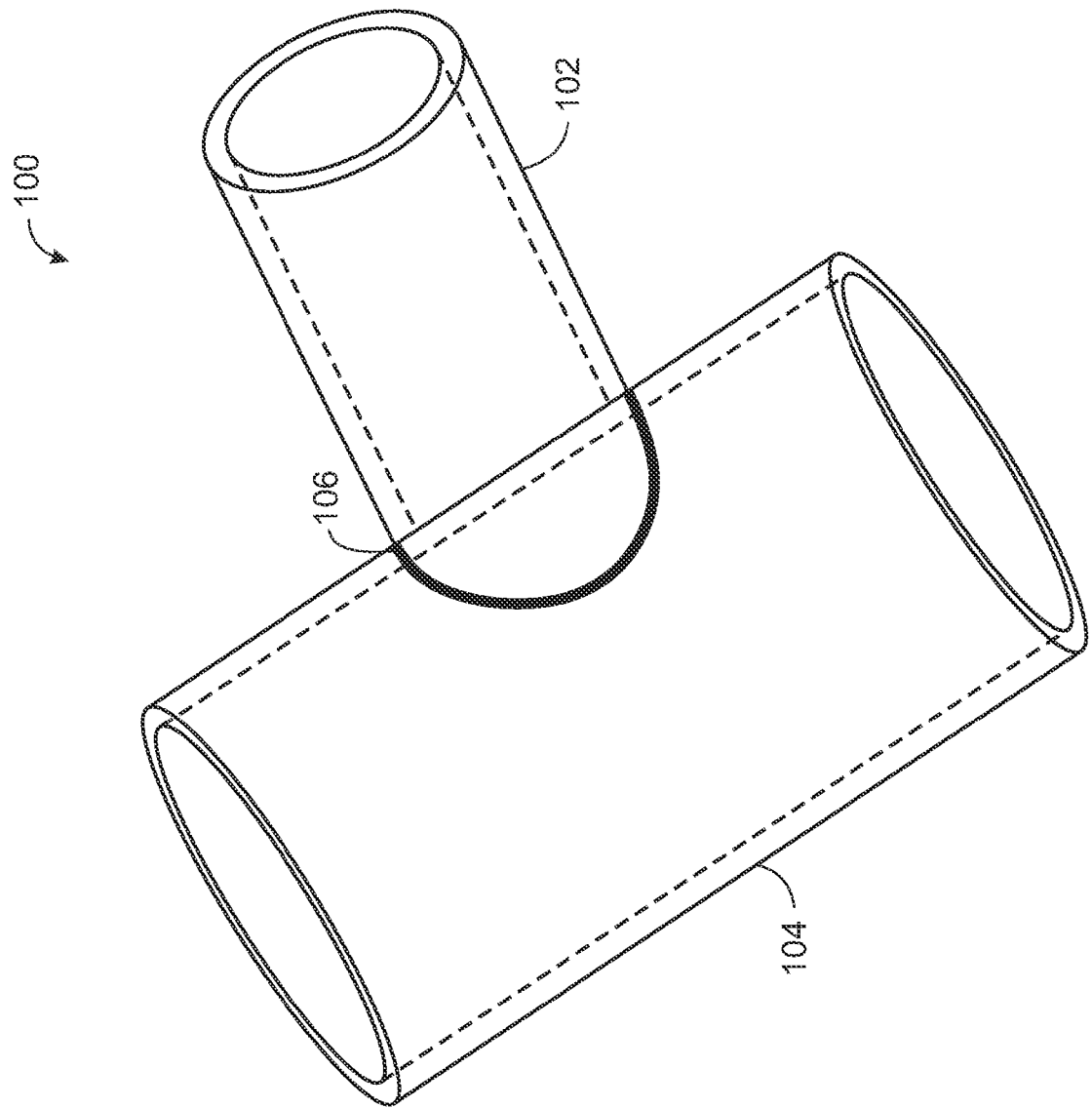

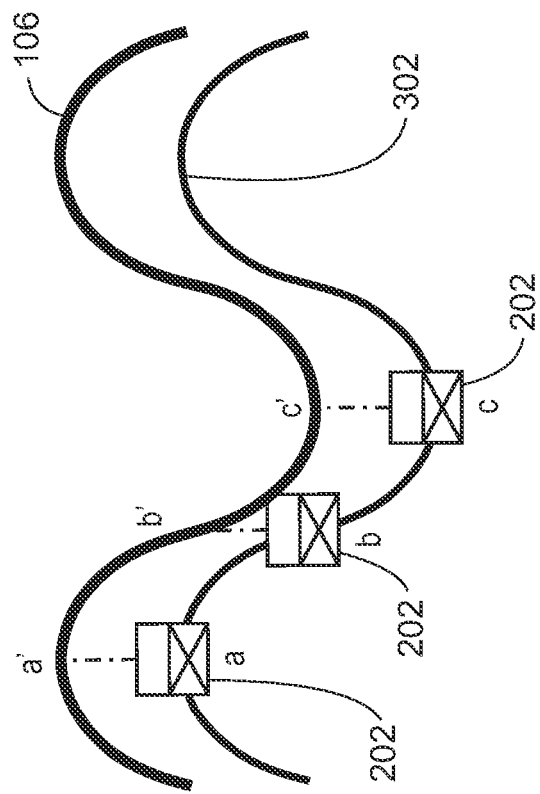
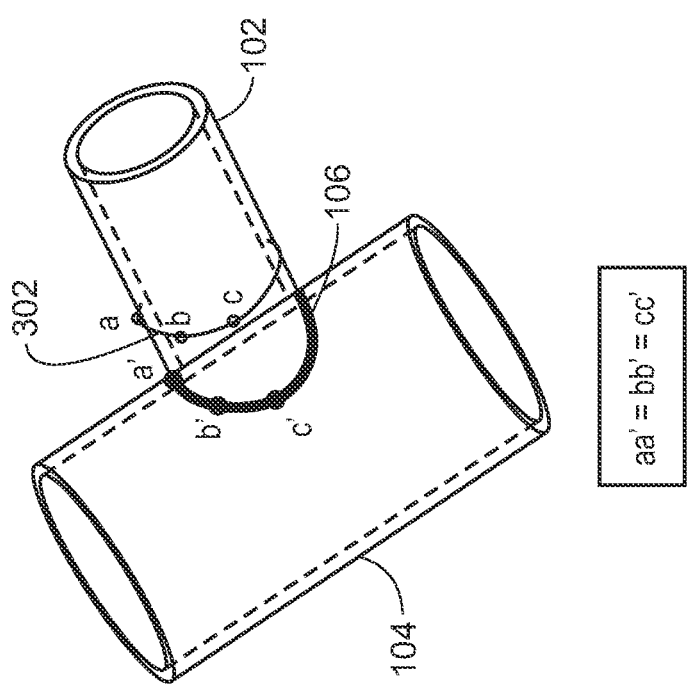
FIGURE 3B
FIGURE 3A
aa' = bb' = cc'

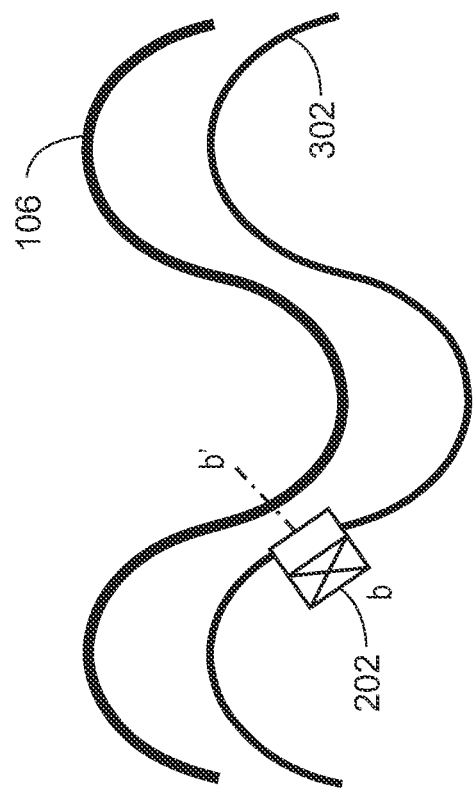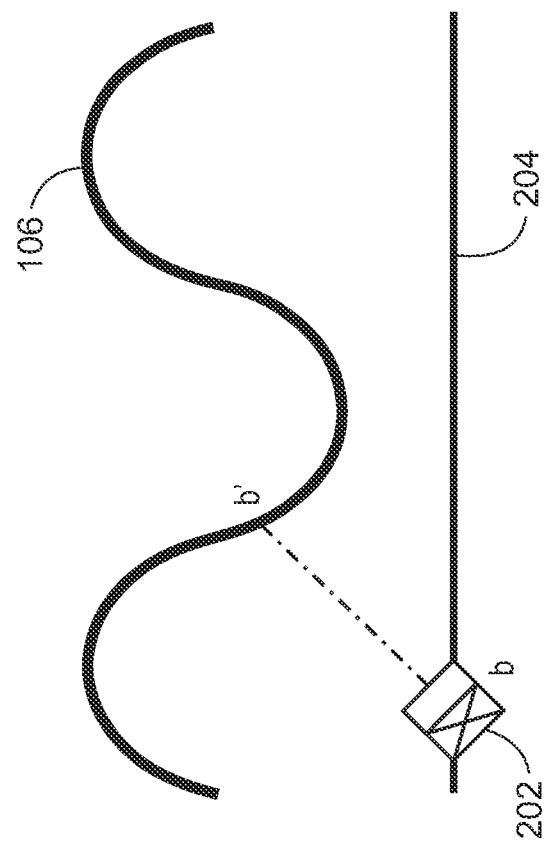
FIGURE 4A
FIGURE 4B

CONVEX ULTRASONIC SENSOR FOR WELD INSPECTION

TECHNICAL FIELD

The present disclosure is directed to an ultrasonic sensor for inspecting welds, specifically at branch pipes.

BACKGROUND

Ultrasonic welding inspection for branch connections can be problematic when the branch pipe to main pipe, or vessel, diameter diameters are similar, especially when the ratio of the diameters of the branch pipe to the mainline, or vessel, is close to one. Further, a reliable inspection of a weld between a branch pipe and a mainline is currently dependent on the technical competency and understanding of the technician performing the scan. These variables can contribute to the possibility of errors, either during the inspection scanning or during the interpretation and evaluation of the images generated.

SUMMARY

An embodiment described in examples herein provides a system for automatic inspection of branch welds. The system includes a scanning head including an ultrasonic probe, wherein the ultrasonic probe includes a convex crystal. A track is mounted to a branch pipe welded to a main pipe, wherein the scanning head mounts to the track, and wherein the scanning head moves the ultrasonic probe along the track. The system includes a controller configured to display an image based on data provided from the ultrasonic probe.

Another embodiment described in examples herein provides a method for automatic inspection of a branch well. The method includes mounting a scanner track along an outer circumference of a branch pipe, mounting a scanning head on the scanner track, wherein the scanning head includes an ultrasonic probe including a convex crystal. The method includes scanning along the outer circumference of the branch pipe to collect ultrasonic data, analyzing the ultrasonic data to generate an image, and determining if defects in the branch weld are present based on the image.

BRIEF DESCRIPTION OF DRAWINGS

FIG. 1 is a drawing of a branch connection with a branch pipe joined to a main run-pipe by a weld.

FIGS. 3A and 3B are drawings of an arcuate, or parallel, scanning path for an automated inspection of a weld.

FIGS. 4A and 4B are drawings of ultrasonic scanning track configuration showing angulation of a probe during the inspection for each of the track configurations.

DETAILED DESCRIPTION

Techniques are provided herein for the inspection of branch connection welds, for example, when the ratio of the diameter of the branch to that of the mainline approaches "1". A convex crystal ultrasonic sensor is proposed for inspection automation of such welds. The convex crystal provides a divergent, conical beam with a virtual focal point located at the back of crystal, within the body of sensor head. The emitted conical beam will improve the probability-of-detection (PoD) for flaws in such welds. This inspection approach will reduce errors and increase the inspection throughput.

Further, the use of the convex crystal is expected to improve industry inspections of T, K, and Y weld configurations. These configurations are challenging inspections that need highly skilled inspectors. The results of these inspections are difficult to cross check as many processes are manual and do not have permanent data recording.

FIG. 1 is a drawing of a branch connection 100 with a branch pipe 102 joined to a main run-pipe 104 by a weld 106. In embodiments described herein, automatic ultrasonic inspection of the weld 106 is performed using a convex crystal in an ultrasonic probe. To perform the inspection, an ultrasonic transducer sensor is pointed at the weld 106, and circles around the circumference of the branch pipe 102. The scanning motion may be controlled using a track mounted around the branch pipe 102. Generally, there are two configurations that can be used to achieve this scanning movement, as discussed further with respect to FIGS. 2A, 2B, 3A, and 3B.

Figure 2B:
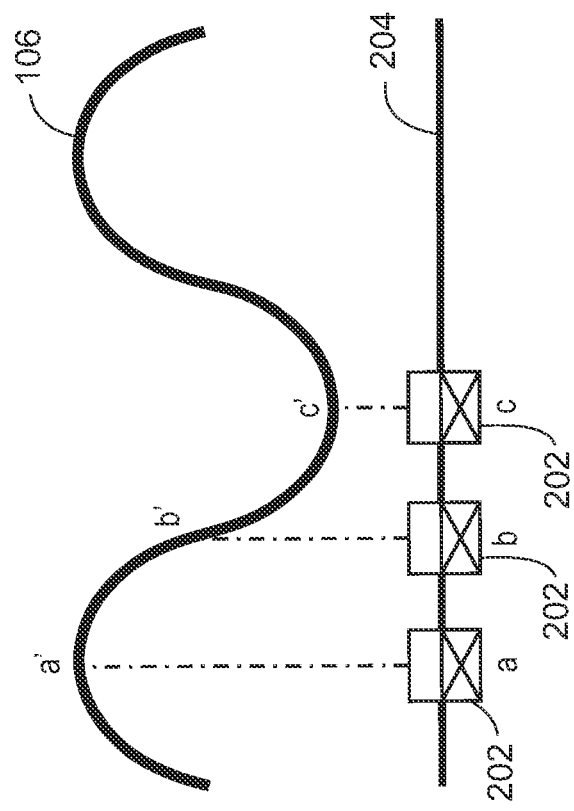
FIGS. 2A and 2B are drawings of a circular, or non-parallel, scanning path for an automated inspection of a weld.
Figure 2A:
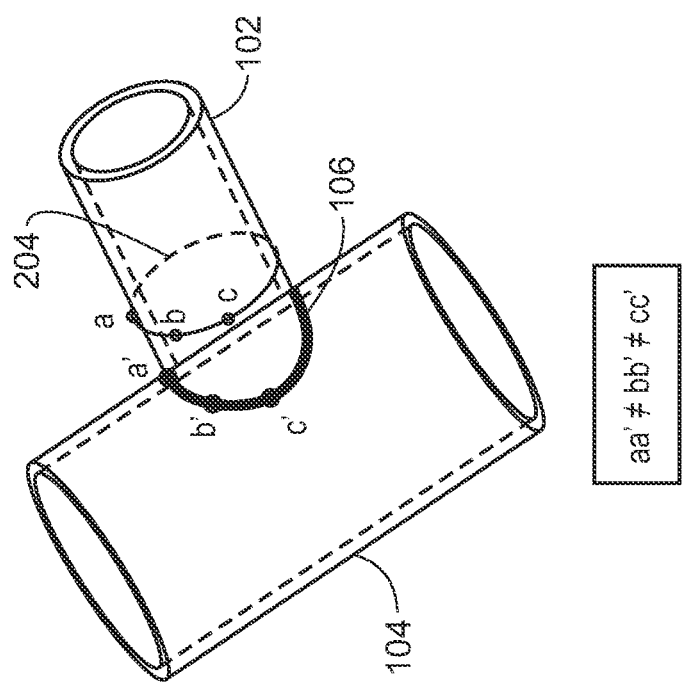

FIGS. 2A and 2B are drawings of a circular, or non-parallel, scanning path for an automated inspection of a weld 106. As used herein, a non-parallel scanning path indicates that the distance between the weld 106 and a scanning head 202 varies as the scanning head 202 follows a circular track 204 around the branch pipe 102, as shown in FIG. 2A. For example, the distance between the scanning head 202 and the weld 106 can range from a maximum of a-a' to a minimum of c-c', as shown in FIG. 2B.

The mounting of the circular track 204 on the branch pipe 102 simplifies the scanning and mounting in comparison to other configurations, for example, as described with respect to FIGS. 3A and 3B. Further, the position coordinates of the scanning head along the circular track 204 are easier to control. This makes the design and programming of a user interface relatively straightforward.

Furthermore, the correlation between the position of the scanning head 202 and the reconstruction of defects in a three-dimensional configuration is more straightforward to calculate than in other configurations. The acoustic coupling of the ultrasonic transducer probe is also more consistent during the scan.

However, the interpretation of the ultrasonic data in the return signals is more complex than in other configurations. In some cases, the orientation of the sound path from the ultrasonic probe to the weld 106 will make analysis difficult if not impossible, as the sound path will not be perpendicular to the weld 106. This is illustrated by the orientation of the line between b and b' to the weld 106 in FIG. 2B. Further, as the distance of the ultrasonic probe to the weld 106 varies with the circumferential movement around the branch pipe 102, the ultrasonic coverage of the weld 106 may be compromised. This is shown by the distances between the scanning head 202 and the weld 106. The two factors discussed above may lead to improper evaluation, interpretation, and missing flaws in the weld 106.

FIGS. 3A and 3B are drawings of an arcuate, or parallel, scanning path for an automated inspection of a weld 106. Like numbered items are as described with respect to previous figures. As used herein, the parallel scanning path follows an arcuate track 302 around the branch pipe 102, as shown in FIG. 3A. Using the arcuate track 302, the distance between the scanning head 202 and the weld 106 remains substantially constant throughout the scan, as shown by lines a-a', b-b', and c-c' in FIG. 3B.

However, the arcuate track 302 is a complex structure that is difficult to assemble. Furthermore, the scanning process is more complicated, and the automation of the scanning and the analysis is more difficult because of the changes in coordinates in all three-dimensions. Interpretation of the results may be easier as the distance between the scanning head 202 and the weld 106 will be the same at any point.

However, the angle of the beam from the scanning head 202 to the weld 106 will still change as the scanning head 202 moves around the arcuate track 302, especially at the line b-b'. This may be mitigated by angling the scanning head 202, as discussed further with respect to FIGS. 4A and 4B.

FIGS. 4A and 4B are drawings of ultrasonic scanning track configuration showing angulation of a probe during the inspection for each of the track configurations. Like numbered items are as described with respect to previous figures. FIG. 4A is a schematic drawing showing the angling of the scanning head 202 on a circular track 204, wherein the scanning head 202 is pivoted to point the ultrasonic beam directly at the weld 106, as shown by the line b-b'. The scanning head 202 will pivot back and forth to keep the incident angle perpendicular to the weld 106. Similarly, FIG. 4B is a schematic drawing showing the pivoting of the scanning head 202 on an arcuate track 302 to point the scanning head 202 directly at the weld 106.

However, the pivoting of the scanning head 202 adds significant complexity to the inspection and inspection devices. In addition to the complexity of the targeting of the angle of the scanning head 202, the movement of the scanning head 202 may compromise the acoustical coupling, thus compromising the integrity of the inspection of the weld 106.

As used herein, the acoustical coupling is the contact between the ultrasonic probe of the scanning head 202 with the target material that the ultrasonic beam enters, reflects from, and is detected from by the ultrasonic probe. Thus, the acoustical coupling at the interface between scanning head 202 and the surface of the material being inspected is important for adequate ultrasonic inspection.

Figure 5B:
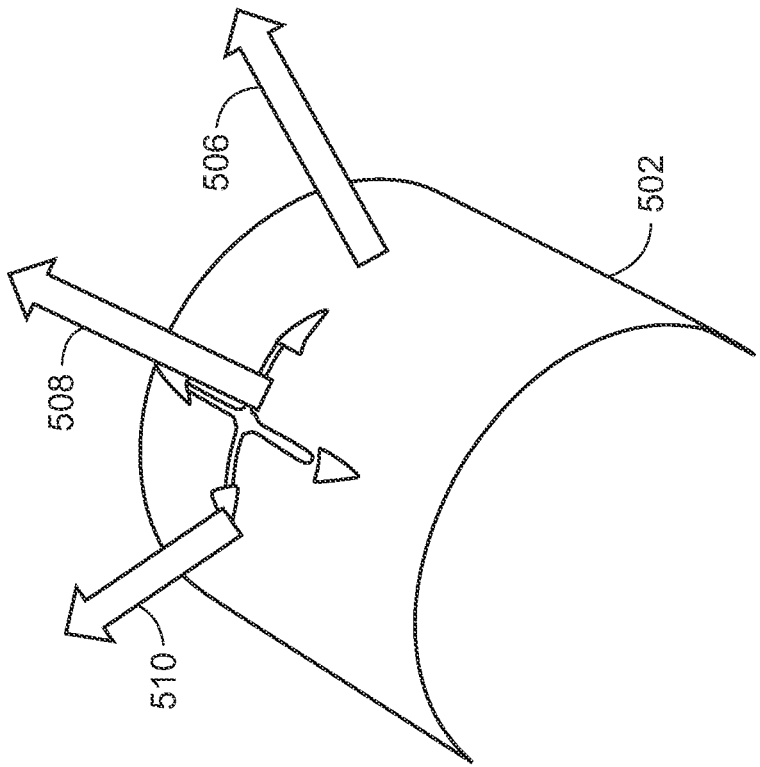
FIGS. 5A and 5B are schematic drawings of a convex ultrasonic sensor, or crystal, with a divergent ultrasonic beam.
Figure 5A:
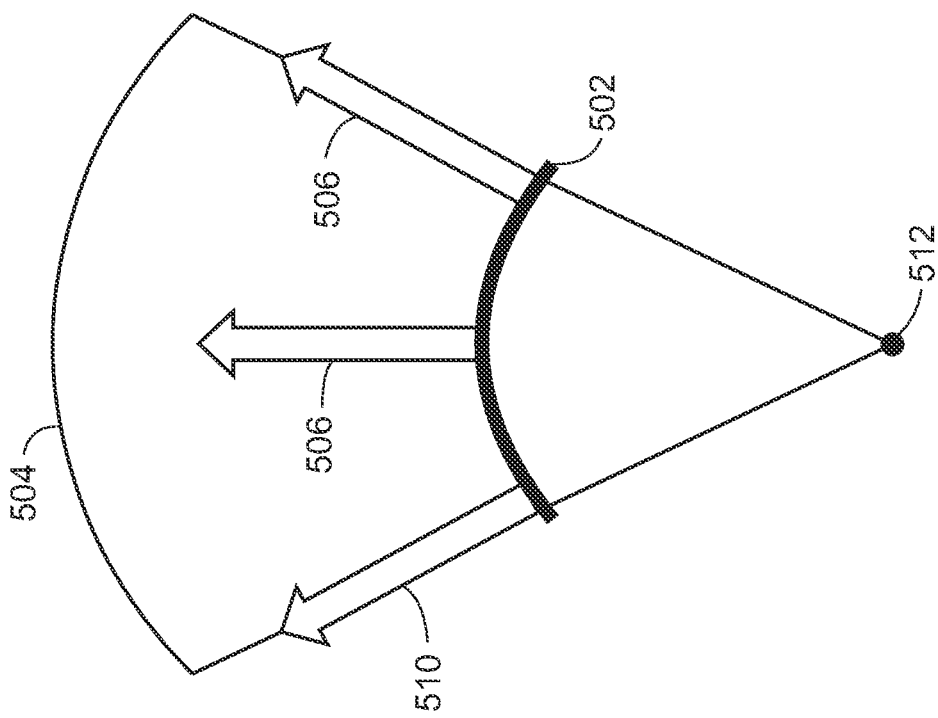

A convex ultrasonic sensor, as described further with respect to FIGS. 5A and 5B, is provided. The convex ultrasonic sensor increases the ultrasonic coverage and reduces the need for probe angulation. This may improve acoustical coupling during scanning.

FIGS. 5A and 5B are schematic drawings of a convex ultrasonic sensor, or crystal, 502 with a divergent ultrasonic beam 504. The crystal 502 has a curved or convex surface providing nonlinear insonification directions, as indicated by arrows 506, 508, and 510. The curved surface of the crystal 502 is also used as a detector in an ultrasonic probe. The convex surface provides an equivalent, or virtual, focal point 512 located behind the surface of the crystal 502. Accordingly, reflections from the test material that are returned to the crystal 502 may be analyzed using the virtual focal point 512 as a point source and detection point for the calculations.

Figure 6:
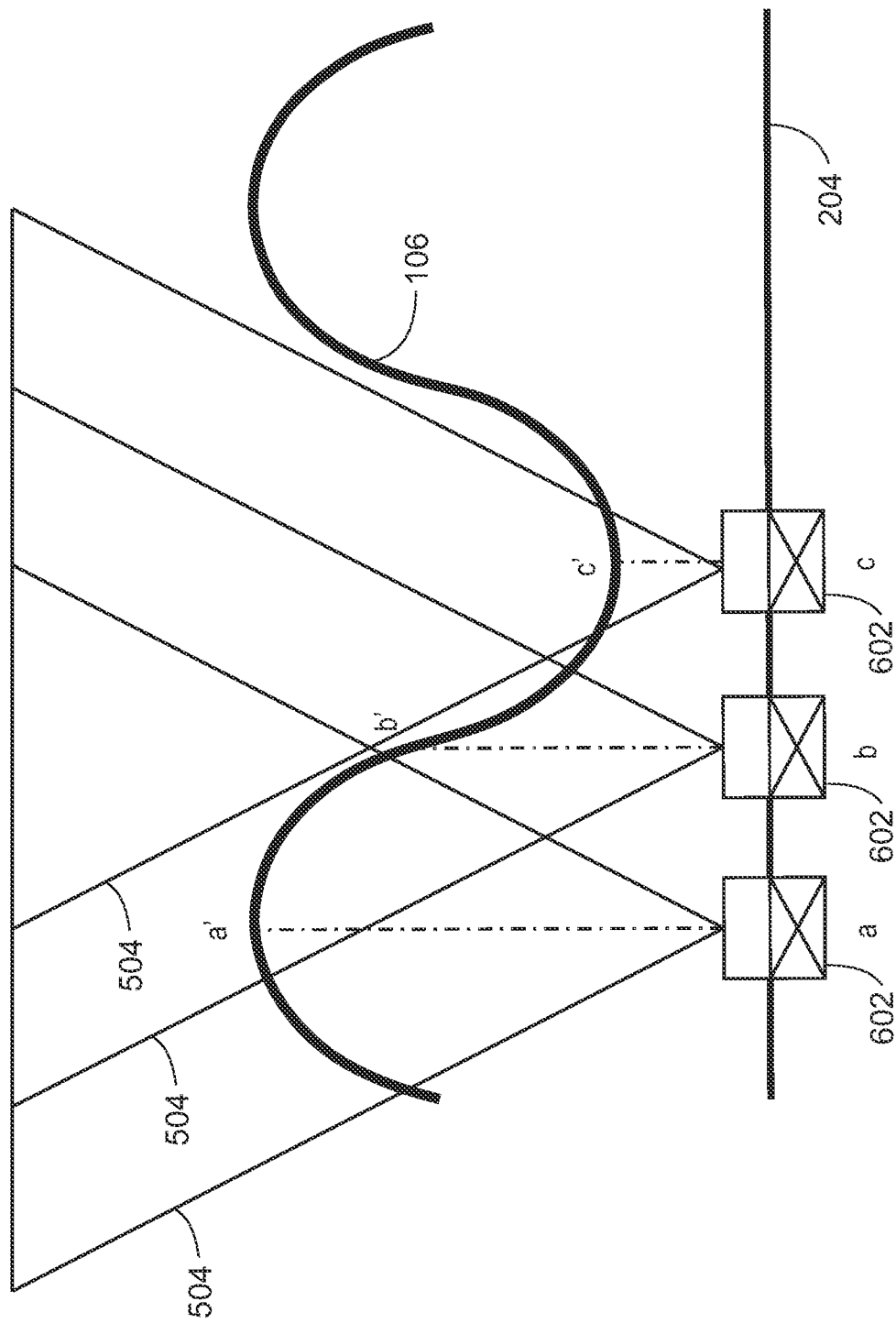
FIG. 6 is a schematic drawing of the use of a scanning head using a convex ultrasonic crystal sensor on a circular track.

FIG. 6 is a schematic drawing of the use of a scanning head 602 using a convex ultrasonic crystal sensor on a circular track 204. Like numbers are as described with respect to previous figures. As shown in FIG. 6, the divergent ultrasonic beam 504 provides adequate coverage at all points along the weld 106 without the need for pivoting the scanning head 602. This is shown by lines a-a', b-b', and c-c'. Thus, imaging of flaws in the weld can be performed with relatively straightforward calculations as discussed further with respect to FIG. 7.

Figure 7:
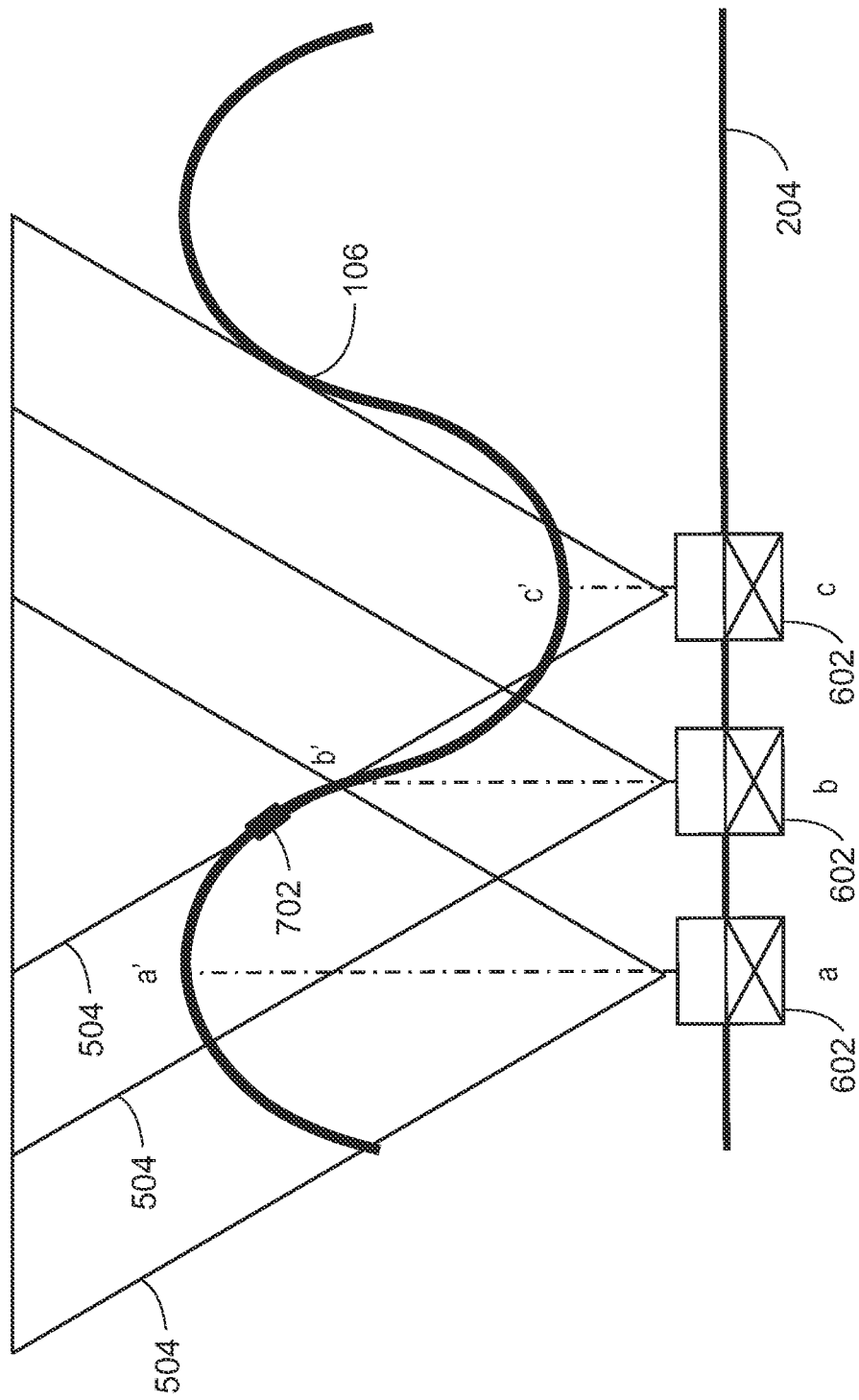
FIG. 7 is a schematic drawing of the ultrasonic scanning track configuration of FIG. 6 with the scanning head that includes the convex crystal for the identification of a flaw in the weld.

FIG. 7 is a schematic drawing of the ultrasonic scanning track configuration of FIG. 6 with the scanning head 602 that includes the convex crystal for the identification of a flaw 702 in the weld 106. Like numbered items are as described with respect to previous figures. The divergent ultrasonic beam 504 from the convex crystal provides inspection coverage for the flaw 702 from multiple positions of the scanning head 602, for example, as shown at positions a, b, and c in FIG. 7. Accordingly, the flaw 702 can be imaged using return signal processing that is simplified by the position of the scanning head 602 along the circular track 204. Software triangulation may be used to precisely locate the flaw 702.

Figure 8:
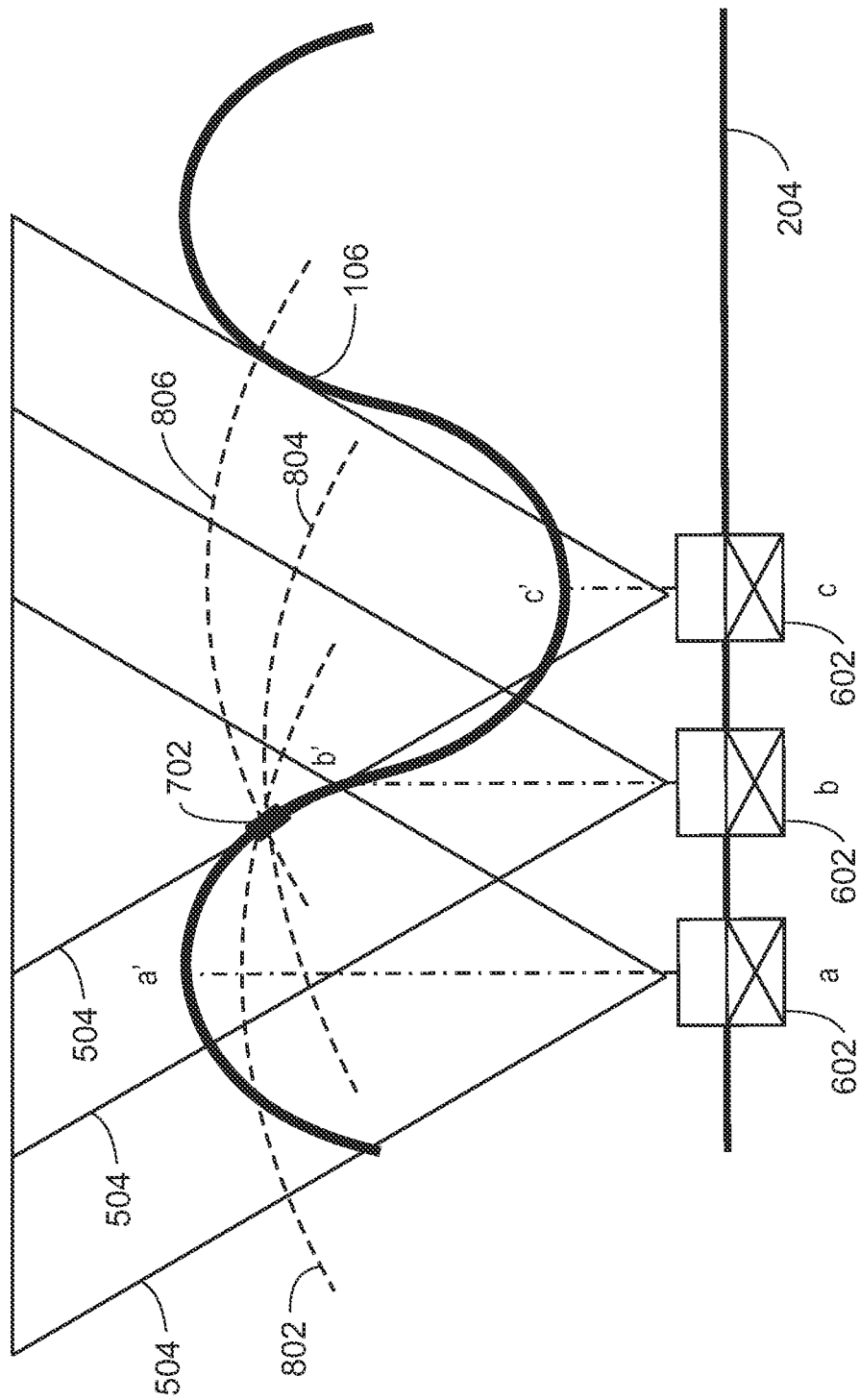
FIG. 8 is a schematic drawing showing the point of overlap of the divergent beam with the flaw at each position a, b, and c along the circular track.

FIG. 8 is a schematic drawing showing the point of overlap 802, 804, and 806 of the divergent ultrasonic beam 504 with the flaw 702 at each position a, b, and c along the circular track 204. Like numbered items are as described with respect previous figures. As shown, the scanning head 602 provides adequate inspection coverage with a single convex crystal emitting the divergent ultrasonic beam 504 used for the inspection.

Accordingly, use of the convex crystal in the scanning head 602 substantially increases the probability of detection of the flaw 702, versus a linear beam crystal, even at unfavorable orientations. Thus, the scanning head 602 reduces the mechanical complexity of the design of the inspection scanner over the use of an arcuate track, reduces the complexity of the analysis in comparison to a pivoting scanning head, and increases the probability of detection for flaws located at unfavorable locations.

Figure 9:
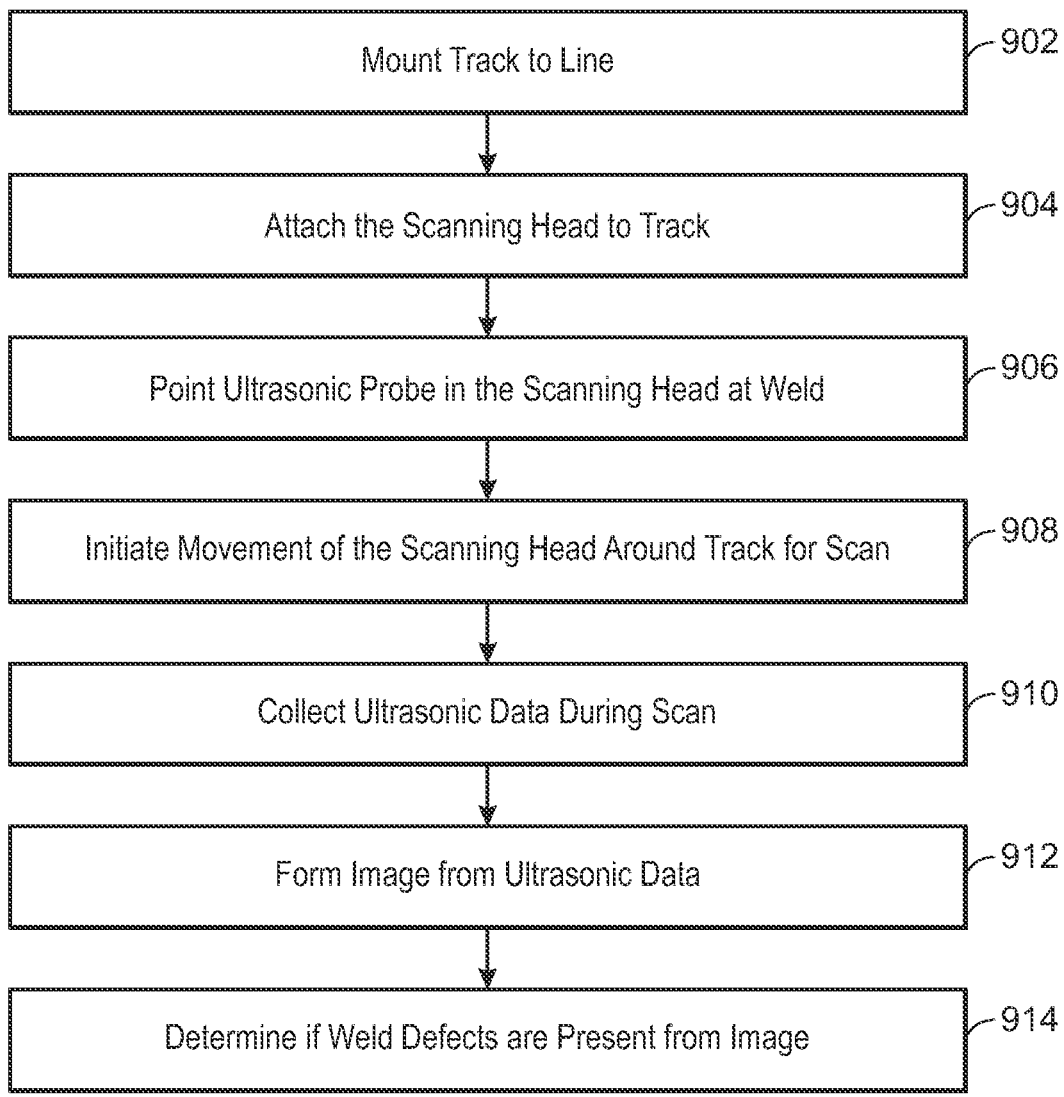
FIG. 9 is a process flow diagram of a method for using a convex crystal ultrasonic probe to identify a flaw in a weld.

FIG. 9 is a process flow diagram of a method 900 for using a convex crystal ultrasonic probe to identify a flaw in a weld. The method 900 begins at block 902, when the track is mounted along the branch pipe for the inspection. As described herein, the track can either be a circular track or an arcuate track, although the circular track provides a simpler procedure.

At block 904 the scanning head is attached to the track. The scanning head may include a pin that insert into a groove on the track to hold the scanning head in place while a rack gear in the scanning head couples to a pinion gear in the track. Any number of other configurations may be used. For example, a rack gear on each side of the scanning head may engage with a recessed pinion gear in a groove on the track.

At block 906, the ultrasonic probe in the scanning head is targeted at the weld. Depending on the proximity of the scanning head to the weld, multiple reflections of the ultrasonic beam in the branch pipe may be used to reach and return from the weld. In some embodiments, liquids or gels are used to increase the acoustical coupling between the scanning head and the branch pipe.

At block 908, the movement of the scanning head around the track is initiated to start the scan. Depending on the interface between the scanning head and a controller, as discussed further with respect to FIG. 10, this may be performed from a control panel on the analysis unit, or by pressing a button on the scanning head.

At block 910, ultrasonic data is collected from the ultrasonic transducer, or crystal, in the scanning head during the scan. As described herein, the data may be transmitted during the scan and saved in the controller, or the data may be saved in the scanning head itself for later analysis.

At block 912, an image is formed from the ultrasonic data. This may be performed in real time during the data collection, for example, if the scanning head is in direct communication with the controller. Alternatively, this may be performed after the data collection by the downloading of the data from the scanning head into the controller.

At block 914, a determination is made as to whether weld defects are present from the image. This may be performed by a user examining the image, or by an automated system that highlights the defects and their positions. In some embodiments, an automated system may assist the user in finding defects.

Figure 10:
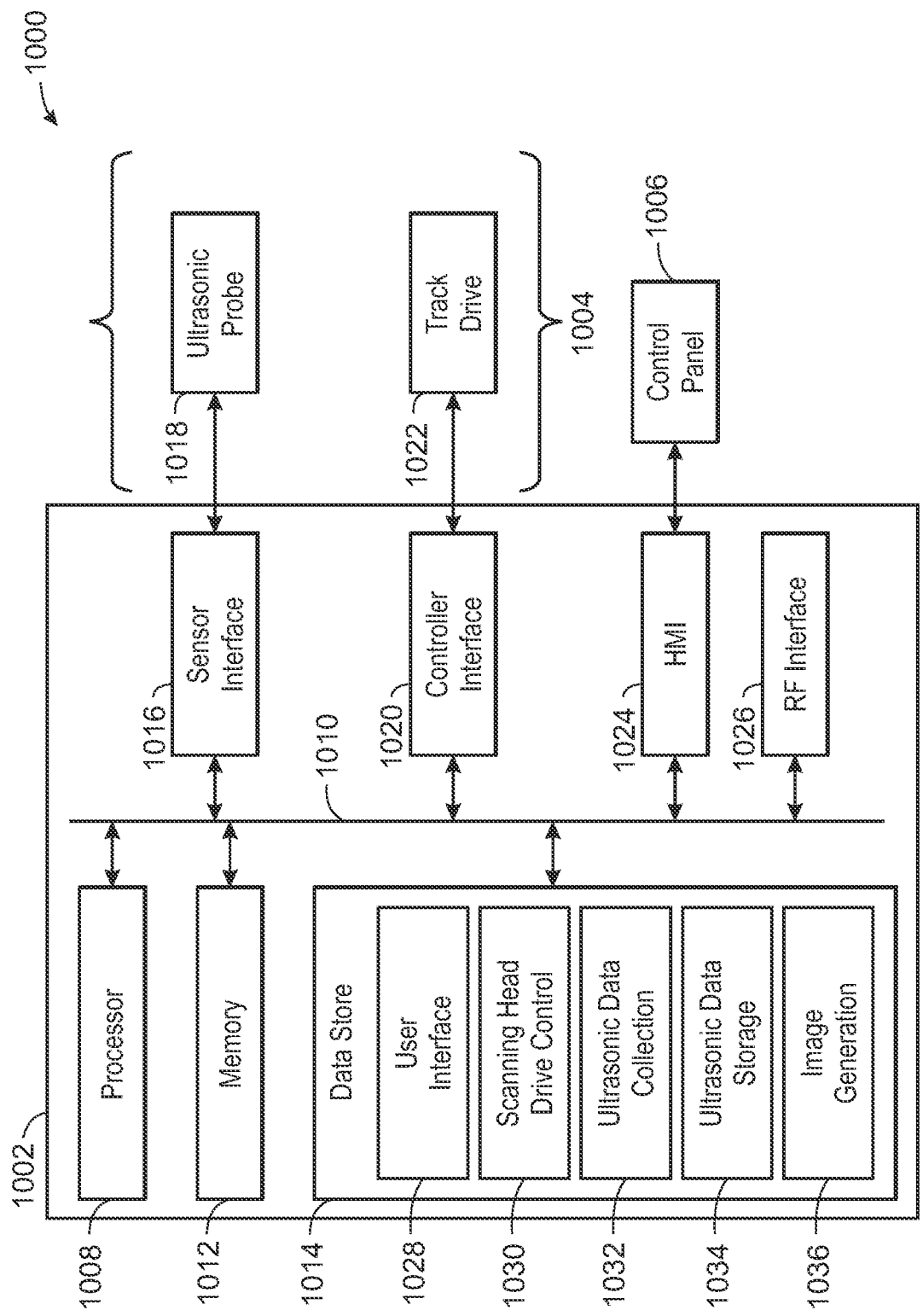
FIG. 10 is a block diagram of an ultrasonic scanning system using a convex crystal.

FIG. 10 is a block diagram of an ultrasonic scanning system 1000 using a convex crystal. The ultrasonic scanning system 1000 includes a controller 1002, a scanning head 1004, and a control panel 1006. In some embodiments, the controller 1002 is a microcontroller, for example, mounted in an enclosure with the control panel 1006.

The controller 1002 includes a processor 1008. The processor 1008 may be a microprocessor, a multi-core processor, a multithreaded processor, an ultra-low-voltage processor, an embedded processor, or a virtual processor. In some embodiments, the processor 1008 may be part of a system-on-a-chip (SoC) in which the processor 1008 and the other components of the controller 1002 are formed into a single integrated electronics package. In various embodiments, the processor 1008 may include processors from Intel® Corporation of Santa Clara, California, from Advanced Micro Devices, Inc. (AMD) of Sunnyvale, California, or from ARM Holdings, LTD., Of Cambridge, England. Any number of other processors from other suppliers may also be used.

The processor 1008 may communicate with other components of the controller 1002 over a bus 1010. The bus 1010 may include any number of technologies, such as industry standard architecture (ISA), extended ISA (EISA), peripheral component interconnect (PCI), peripheral component interconnect extended (PCIx), PCI express (PCIe), or any number of other technologies. The bus 1010 may be a proprietary bus, for example, used in an SoC based system. Other bus technologies may be used, in addition to, or instead of, the technologies above.

The bus 1010 may couple the processor 1008 to a memory 1012. In some embodiments, the memory 1012 is integrated with a data store 1014 used for long-term storage of programs and data. The memory 1012 includes any number of volatile and nonvolatile memory devices, such as volatile random-access memory (RAM), static random-access memory (SRAM), flash memory, and the like. In smaller devices, such as portable analysis units, the memory 1012 may include registers associated with the processor itself.

The data store 1014 is used for the persistent storage of information, such as data, applications, operating systems, and so forth. The data store 1014 may be a nonvolatile RAM, a solid-state disk drive, or a flash drive, among others. In some embodiments, the data store 1014 will include a hard disk drive, such as a micro hard disk drive or a solid-state drive (SSD).

The bus 1010 couples the processor 1008 to a sensor interface 1016. The sensor interface 1016 connects the controller 1002 to the ultrasonic probe 1018 in the scanning head 1004 that is used to implement the ultrasonic scan. In some embodiments, the sensor interface 1016 is a bank of high-speed analog-to-digital converters (ADCs), an I2C bus, a serial peripheral interface (SPI) bus, a high-speed serial bus interface, and the like. As described herein, in various embodiments, the ultrasonic probe 1018 is a convex crystal that provides a divergent ultrasonic beam for scanning a weld for defects. The scanning head 1004 is coupled to a track to allow movement around a pipe during the ultrasonic scanning.

The bus 1010 couples the processor 1008 to a controller interface 1020 that is used operate a track drive 1022 in the scanning head 1004 for moving over the track. In some embodiments, the controller interface 1020 is a bank of MOSFET power controllers, a serial peripheral interface (SPI), and the like. In some embodiments, the track drive 1022 is a solenoid motor that is moved by a pulse from the controller interface 1020. The solenoid motor allows the determination of the position of the scanning head from the number of pulses and the polarity of the pulses sent to the solenoid motor. In other embodiments, the track drive 1022 includes a position sensor to determine the position of the scanning head 1004. In these embodiments, other types of digital or analog motors may be used.

The bus 1010 couples the processor 1008 to a human machine interface (HMI) 1024. The HMI 1024 couples the controller 1002 to a control panel 1006. In some embodiments, the control panel 1006 includes a display for displaying an image of the scan and buttons to control the scan. In some embodiments, the display is a touchscreen display that can display programmable buttons appropriate to the cycle of the scan.

In some embodiments, the bus 1010 couples the processor 1008 to a radio frequency (RF) interface 1026. The RF interface 1026 may be a wireless networking protocol interface, such as Wi-Fi, among others. In various embodiments, the RF interface 1026 is used to communicate between the controller and the scanning head panel for. In these embodiments, the lines coupling the sensor interface 1016 to the ultrasonic probe 1018 and the controller interface 1020 to the track drive 1022 are replaced by the communications with the RF interface 1026. Further, the scanning head will include control electronics and power in addition to another RF communications device for coupling to the RF interface 1026.

The data store 1014 includes blocks of stored instructions that, when executed, direct the processor 1008 to implement the functions of the controller 1002. The data store 1014 includes a block 1028 of instructions to direct the processor to provide a user interface on the control panel 1006 through the HMI 1024. For example, the user interface may include controls to power the track drive 1022 from the controller interface 1020 for implementing a scan. Further, the user interface may display an image generated from the ultrasonic data collected from the ultrasonic probe 1018.

The data store 1014 includes a block 1032 of instructions to direct the processor The data store 1014 includes a block 1032 of instructions to direct the processor 1008 to collect ultrasonic data from the ultrasonic probe 1018, for example, using the sensor interface 1016. In some embodiments, for example when there is not a direct connection between the controller 1002 and the scanning head, the block 1032 of instructions directs the processor 1008 to collect the ultrasonic data using the RF interface 1026.

The data store 1014 includes a block 1034 used to store ultrasonic data collected during the scan. In some embodiments, the ultrasonic data is not stored but is directly used to generate an image. In other embodiments, the ultrasonic data of block 1034 is stored on an external memory device, such as thumb drive or an SD memory card, among others. In these cases, the external memory device couples to the controller through a port or a slot to allow the controller 1002 to use the ultrasonic data to generate an image.

The data store 1014 includes a block 1036 of instructions to direct the processor 1008 to generate an image from the ultrasonic data. The image may then be displayed on the control panel by the user interface. As described above, in some embodiments, the image is directly generated during the data collection, and the ultrasonic data is not stored.

EMBODIMENTS

An embodiment described in examples herein provides a system for automatic inspection of branch welds. The system includes a scanning head including an ultrasonic probe, wherein the ultrasonic probe includes a convex crystal. A track is mounted to a branch pipe welded to a main pipe, wherein the scanning head mounts to the track, and wherein the scanning head moves the ultrasonic probe along the track. The system includes a controller configured to display an image based on data provided from the ultrasonic probe.

In an aspect, the convex crystal has a conical beam including a focal point behind the surface of the convex crystal.

In an aspect, the track includes a rack gear configured to couple to a pinion gear on the scanning head. In an aspect, the scanning head includes a motor coupled to the pinion gear to move the scanning head along the rack gear of the track. In an aspect, the scanning head includes a magnet to hold the scanning head to the branch pipe. In an aspect, the scanning head includes a radio communications device to couple the ultrasonic probe to the controller.

In an aspect, the scanning head includes a memory to store ultrasonic data from the ultrasonic probe. In an aspect, the controller couples to the memory to download the ultrasonic data from the ultrasonic probe.

In an aspect, the controller includes a processor, a sensor interface coupled to the ultrasonic probe, a controller interface coupled to the scanning head, and a data store. The data store includes instructions that, when executed, direct the processor to obtain control inputs from a user, control the scanning head to move the ultrasonic probe along the track, collect ultrasonic data from the ultrasonic probe, store the ultrasonic data, and generate the image from the ultrasonic data.

In an aspect, the data store includes instructions that, when executed, direct the processor to obtain the ultrasonic data from a memory in the scanning head. In an aspect, the data store includes instructions that, when executed, direct the processor to highlight potential weld defects in the image.

In an aspect, the controller includes a radio frequency (RF) interface to couple to the scanning head. In an aspect, the RF interface includes a Wi-Fi interface system.

In an aspect, the data store includes instructions, that when executed, direct the processor to communicate with external networks.

Another embodiment described in examples herein provides a method for automatic inspection of a branch well. The method includes mounting a scanner track along an outer circumference of a branch pipe, mounting a scanning head on the scanner track, wherein the scanning head includes an ultrasonic probe including a convex crystal. The method includes scanning along the outer circumference of the branch pipe to collect ultrasonic data, analyzing the ultrasonic data to generate an image, and determining if defects in the branch weld are present based on the image.

In an aspect, the method includes mounting the scanner track in a circular pattern around the outer circumference of the branch pipe. In an aspect, the method includes mounting the scanner track parallel to the branch weld.

In an aspect, the method includes applying an acoustic coupling fluid to the branch pipe under the scanning head.

In an aspect, the method includes storing the ultrasonic data in a memory in the scanning head. In an aspect, the method includes generating the image from the ultrasonic data stored in the memory.

Other implementations are also within the scope of the following claims.

What is claimed is:

1. A system for automatic inspection of branch welds, comprising:
   a scanning head comprising an ultrasonic probe, wherein the ultrasonic probe comprises a convex crystal;
   a track mounted to a branch pipe welded to a main pipe, wherein the scanning head mounts to the track, and wherein the scanning head moves the ultrasonic probe along the track; and
   a controller configured to display an image based on data provided from the ultrasonic probe.

2. The system of claim 1, wherein the convex crystal has a conical beam comprising a focal point behind the surface of the convex crystal.

3. The system of claim 1, wherein the track comprises a rack gear configured to couple to a pinion gear on the scanning head.

4. The system of claim 3, wherein the scanning head comprises a motor coupled to the pinion gear to move the scanning head along the rack gear of the track.

5. The system of claim 1, wherein the scanning head comprises a magnet to hold the scanning head to the branch pipe.

6. The system of claim 1, wherein the scanning head comprises a radio communications device to couple the ultrasonic probe to the controller.

7. The system of claim 1, wherein the scanning head comprises a memory to store ultrasonic data from the ultrasonic probe.

8. The system of claim 7, wherein the controller couples to the memory to download the ultrasonic data from the ultrasonic probe.

9. The system of claim 1, wherein the controller comprises:
   a processor;
   a sensor interface coupled to the ultrasonic probe;
   a controller interface coupled to the scanning head; and
   a data store, wherein the data store comprises instructions that, when executed, direct the processor to:
      obtain control inputs from a user;
      control the scanning head to move the ultrasonic probe along the track;

collect ultrasonic data from the ultrasonic probe;
store the ultrasonic data; and
generate the image from the ultrasonic data.

10. The system of claim 9, wherein the data store comprises instructions that, when executed, direct the processor to obtain the ultrasonic data from a memory in the scanning head.

11. The system of claim 9, wherein the data store comprises instructions that, when executed, direct the processor to highlight potential weld defects in the image.

12. The system of claim 9, wherein the controller comprises a radio frequency (RF) interface to couple to the scanning head.

13. The system of claim 12, wherein the RF interface comprises a Wi-Fi interface system.

14. The system of claim 12, wherein the data store comprises instructions, that when executed, direct the processor to communicate with external networks.

15. A method for automatic inspection of a branch weld, comprising:
mounting a scanner track along an outer circumference of a branch pipe, welded to a main pipe;
mounting a scanning head on the scanner track, wherein the scanning head comprises an ultrasonic probe comprising a convex crystal;
scanning along the outer circumference of the branch pipe to collect ultrasonic data;
analyzing the ultrasonic data to generate an image; and
determining if defects in the branch weld are present based on the image.

16. The method of claim 15, comprising mounting the scanner track in a circular pattern around the outer circumference of the branch pipe.

17. The method of claim 15, comprising mounting the scanner track parallel to the branch weld.

18. The method of claim 15, comprising applying an acoustic coupling fluid to the branch pipe under the scanning head.

19. The method of claim 15, comprising storing the ultrasonic data in a memory in the scanning head.

20. The method of claim 19, comprising generating the image from the ultrasonic data stored in the memory.

* * * * *